United States Patent
Kingsley

(10) Patent No.: US 9,628,209 B2
(45) Date of Patent: Apr. 18, 2017

(54) TIME SYNCHRONIZATION IN DISTRIBUTED NETWORK TESTING EQUIPMENT

(71) Applicant: JDS Uniphase Corporation, Milpitas, CA (US)

(72) Inventor: Paul Kingsley, Monument, CO (US)

(73) Assignee: VIAVI SOLUTIONS INC., Milpitas, CA (US)

( * ) Notice: Subject to any disclaimer, the term of this patent is extended or adjusted under 35 U.S.C. 154(b) by 423 days.

(21) Appl. No.: 14/158,480

(22) Filed: Jan. 17, 2014

(65) Prior Publication Data

US 2014/0247839 A1 Sep. 4, 2014

Related U.S. Application Data

(60) Provisional application No. 61/753,652, filed on Jan. 17, 2013.

(51) Int. Cl.
*H04J 3/06* (2006.01)
*H04J 3/14* (2006.01)
*H04L 12/26* (2006.01)

(52) U.S. Cl.
CPC .......... *H04J 3/0667* (2013.01); *H04J 3/0673* (2013.01); *H04J 3/14* (2013.01); *H04L 43/12* (2013.01); *H04L 43/50* (2013.01)

(58) Field of Classification Search
CPC .......... H04J 3/0667; H04J 3/0673; H04J 3/14; H04L 43/12; H04L 43/50
See application file for complete search history.

(56) References Cited

U.S. PATENT DOCUMENTS

| | | | |
|---|---|---|---|
| 5,566,180 A | 10/1996 | Eidson et al. | 370/473 |
| 6,252,445 B1 | 6/2001 | Eidson | 327/172 |
| 6,278,710 B1 | 8/2001 | Eidson | 370/394 |
| 6,370,159 B1 | 4/2002 | Eidson | 370/503 |
| 8,427,966 B2 | 4/2013 | Ilnicki | 370/252 |
| 9,106,353 B2 * | 8/2015 | Hsueh | H04L 63/0428 |
| 2007/0063871 A1 * | 3/2007 | Engel | H04Q 9/00 340/870.07 |

(Continued)

OTHER PUBLICATIONS

IEEE Standard 1588TM—2008 "IEEE Standard for a Precision Clock Synchronization Protocol for Networked Measurement and Control Systems", Jul. 24, 2006.

(Continued)

*Primary Examiner* — Man Phan
*Assistant Examiner* — Ryan Kavleski
(74) *Attorney, Agent, or Firm* — Mannava & Kang, P.C.

(57) ABSTRACT

The invention relates to time synchronization between network testing elements in distributed network monitoring and testing systems, and provides a method for synchronizing packet timestamps generated by a network probe with a free running clock to a master clock connected at a different location of the network. In one implementation, the probe eavesdrops on a PTP message exchange between the master and a remote slave device, recording message reception times according to it free running clock and transmitting relevant timing information to a rest server for determining the probe clock offset and updating the probe packet timestamps.

15 Claims, 11 Drawing Sheets

(56) References Cited

U.S. PATENT DOCUMENTS

| | | | |
|---|---|---|---|
| 2009/0113229 A1* | 4/2009 | Cataldo | G01R 31/31907 713/400 |
| 2011/0064091 A1* | 3/2011 | Darras | H04J 3/0673 370/458 |
| 2011/0170534 A1 | 7/2011 | York | 370/350 |
| 2011/0200051 A1* | 8/2011 | Rivaud | H04J 3/0641 370/400 |
| 2011/0262133 A1* | 10/2011 | Yuan | H04J 3/0667 398/43 |
| 2011/0305150 A1* | 12/2011 | Haver | H04L 12/2697 370/252 |
| 2012/0117180 A1* | 5/2012 | Ranasinghe | H04J 3/0667 709/208 |
| 2013/0315265 A1* | 11/2013 | Webb, III | H04J 3/0635 370/516 |

OTHER PUBLICATIONS

Texas Instruments Application Report SNLA116—May 2009, AN-1963 IEEE 1588 Synchronization over standard networks using the DP83640.

Hirschmann Automation and Control GmbH, White Paper "Precision Clock Synchronization—IEEE 1588", Rev. 1.2, by Andreas Dreher, Dirk Mohl.

John C. Eidson et al, Paper 21 "IEEE-1588™ Standard for a Precision Clock Synchronization Protocol for Networked Measurement and Control Systems", 34th Annual Precise Time and Time Interval (PTTI) Meeting, 2002, pp. 243-254. http://www.pttimeeting.org/archivemeetings/2002papers/paper21.pdf.

\* cited by examiner

TIME SYNCHRONIZATION IN DISTRIBUTED NETWORK TESTING EQUIPMENT

CROSS-REFERENCE TO RELATED APPLICATIONS

The present invention claims priority from U.S. Provisional Patent Application No. 61/753,652 filed Jan. 17, 2013, which is incorporated herein by reference.

TECHNICAL FIELD

The present invention relates generally to networking and communications technology and, more particularly, to time synchronization for distributed network testing equipment.

BACKGROUND OF THE INVENTION

Communications networks often include monitoring and/or testing equipment that is distributed in different parts of the network. Examples of such network monitoring equipment include those described in U.S. Pat. No. 7,336,673 issued Feb. 26, 2008 to Ilnicki et al entitled Creating a Low Bandwidth Channel Within a High Bandwidth Packet Stream, U.S. Pat. No. 7,868,780 issued Jan. 11, 2011 to Engel et al entitled System and Method for Test Probe Management, and U.S. Pat. No. 8,427,966 issued Apr. 23, 2013 in the name of Ilnicki, entitled Programmable Passive Probe, which are incorporated herein by reference.

Often various monitoring and testing devices located at different network sites are required to coordinate their operation, so that their internal clocks must be synchronized in time. One possible mechanism for such synchronization is provided by a Precision Time Protocol (PTP) standard, which is a general protocol that was developed to synchronize clocks throughout a computer network. PTP was originally defined in the IEEE 1588-2002 standard, entitled "Standard for a Precision Clock Synchronization Protocol for Networked Measurement and Control Systems" and published in 2002. In 2008 a revised standard, IEEE 1588-2008 was released, also known as PTP Version 2, which is incorporated herein by reference; it is not backwards compatible with the original 2002 version.

The IEEE 1588 standard defines a hierarchical master-slave architecture for clock distribution, in which a slave clock periodically adjusts its time to that of a master clock by exchanging specific PTP messages therewith. U.S. patent application Ser. No. 13/714,174, which is incorporated herein by reference, discloses a variation of the conventional PTP process wherein the master-slave timing synchronization is accomplished with fewer messages than the conventional 1588 process.

An object of this invention is to provide a mechanism for correlating network packet timestamps to a remote master clock for network packets that were generated by a network device having a free running clock.

SUMMARY OF THE INVENTION

Accordingly, one aspect of present invention provides a method for correlating time of a free running clock in a network probe to a network-connected master clock, wherein the network probe is connected in a network and is configured for filtering messages received from the network according to pre-defined criteria and for inserting messages into network traffic, and wherein the network comprises a remote test server receiving network test messages from the network probe and a master device comprising the master clock. The method comprises a) the network probe participating in an exchange of timing messages with the master device, wherein the network probe obtains, from timing messages received from the master, information indicating master clock times T1 and T4 when a first timing message was transmitted by the master and a second timing message was received by the master, respectively, and wherein the network probe records probe clock times T2 and T3 when the first and second timing messages, respectively, are received or transmitted by the probe; and, b) the network probe transmitting T1, T2, T3, and T4 values to the remote test server for computing a probe time offset O at the remote test server and for adjusting probe timestamps of the test messages received by the server to synchronize with the master clock.

In one aspect of the present invention, the network comprises a slave device comprising a slave clock, with the master device initiating the exchange of timing messages with the slave device by sending the first timing message to the slave device, and wherein step a) of the method comprises the network probe capturing at least the first timing message addressed to the slave device.

In one aspect of the present invention, the network probe is disposed in a communication path between the salve device and the master device for relaying timing messages therebetween, and step a) comprises the network probe eavesdropping on said exchange by copying timing messages sent from the master device to the slave device prior to relaying said messages to the slave device.

In one aspect of the present invention, the probe, upon after capturing the first timing message, sends one or more filtered results packets (FRP) to the server comprising the T1 and T2 values, generates the second timing message and transmits it to the master, records a probe clock time of the transmission thereof as T3, and receives a third timing message sent from the master device to the slave device and comprising the T4 value.

BRIEF DESCRIPTION OF THE DRAWINGS

The invention will be described in greater detail with reference to the accompanying drawings which represent preferred embodiments thereof, in which like elements are indicated with like reference numerals, and wherein.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

Figure 1:
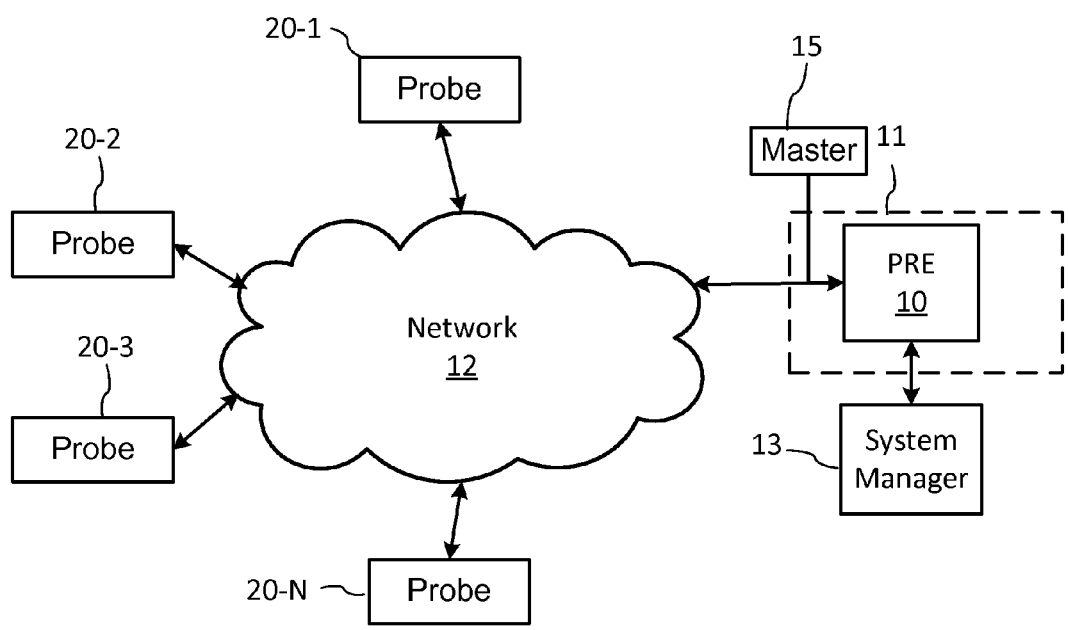
FIG. 1 is a diagram schematically illustrating a distributed monitoring and testing system for a communication network according to prior art.

Note that as used herein, the terms "first", "second" and so forth are not intended to imply sequential ordering, but rather are intended to distinguish one element from another unless explicitly stated. The terms "timing message" and "PTP message" are used herein interchangeably and encompass messages that are exchanged between master and slave devices in the process of timing synchronization between their clocks in accordance with a conventional 1588 PTPT process and in accordance with embodiments of the present invention. Similarly, the terms "timing packet" and "PTP packet" are used herein interchangeably and encompass packets carrying timing or PTP messages in accordance with embodiments of the present invention. Furthermore, the following abbreviations may be used:

ASIC Application Specific Integrated Circuit
FPGA Field Programmable Gate Array
UDP User Datagram Protocol
DSP Digital Signal Processor
CPU Central Processing Unit
IP Internet Protocol
MAC Media Access Control
GRE Generic Routing Encapsulation
MPLS Multiprotocol Label Switching
VLAN Virtual Local Area Network With reference to FIG. 1, there is schematically illustrated a distributed network monitoring and testing system (NMTS) 5 having a plurality of spaced apart probes, which are represented in the figure by probes 20-1, 20-2, 20-3 and 20-N, and which will be referred to hereinafter as probes 20. Data from probes 20 are transmitted over network 12 to a data collection sub-system 11, for example in the form of packets. The data collection sub-system 11, which is also referred to herein as a test server, may include a packet routing engine (PRE), which in one embodiment provides scalable management and control of probes 20, aggregates and distributes captured traffic to target applications and components, such as those provided with a system manager 13 that is connected to the PRE 10 with a communication link.

One embodiment of the NMTS 5 of FIG. 1 is the PacketPortal™ system of JDS Uniphase Corp., which is described, for example in "White Paper: How PacketPortal Works", 2012 JDSU Corp, which is available from JDS Uniphase website, and which is incorporated herein by reference. In this embodiment, the probes 20 may be in the form of SFProbe™ of JDSU PacketPortal™, which are described in "White Paper: The PacketPortal-Enabled SFProbe and How it Differs from a Standard SFP Transceiver", which is also available from the JDSU website and which is incorporated herein by reference. The PacketPortal™ uses SFProbes as intelligent packet director (IPD) transceivers to collect packets from Gigabit Ethernet networks. They can be distributed anywhere where standard SFP transceivers are used, including at access, edge and core routers of the network, allowing network operators and managers to access packet and data at any point in the network where SFPs are used. In other embodiments, NMTS 5 may be any other distributed network testing system requiring time synchronization between network testing elements.

Since the probes 20 and the PRE 11 may exchange time-sensitive information, the internal clocks of the probes 20 and an internal clock of the PRE 10 should be synchronized. One possible way to perform this synchronization is to use the PTP synchronization process that is defined in the IEEE-1588 Standards, so as to synchronize the internal clocks of each probe 20 and the internal clock of the PRE 11 to a network-connect master clock. The IEEE-1588 Standard defines procedures for establishing which of the clocks in a system will play the role of a 'master' clock and which of the clocks will be 'slaves', and defines a process for synchronizing the slave clocks to the master clock. In the context of the network monitoring system 5 composed of network testing elements 10, 20 such as that shown in FIG. 1, master-slave clock relationships are usually implicitly known. For example, in the JDSU Packet Portal™ solution the PRE 10 may provide the master clock 15 and the probe 20 may implement the slave clock.

Figure 2:
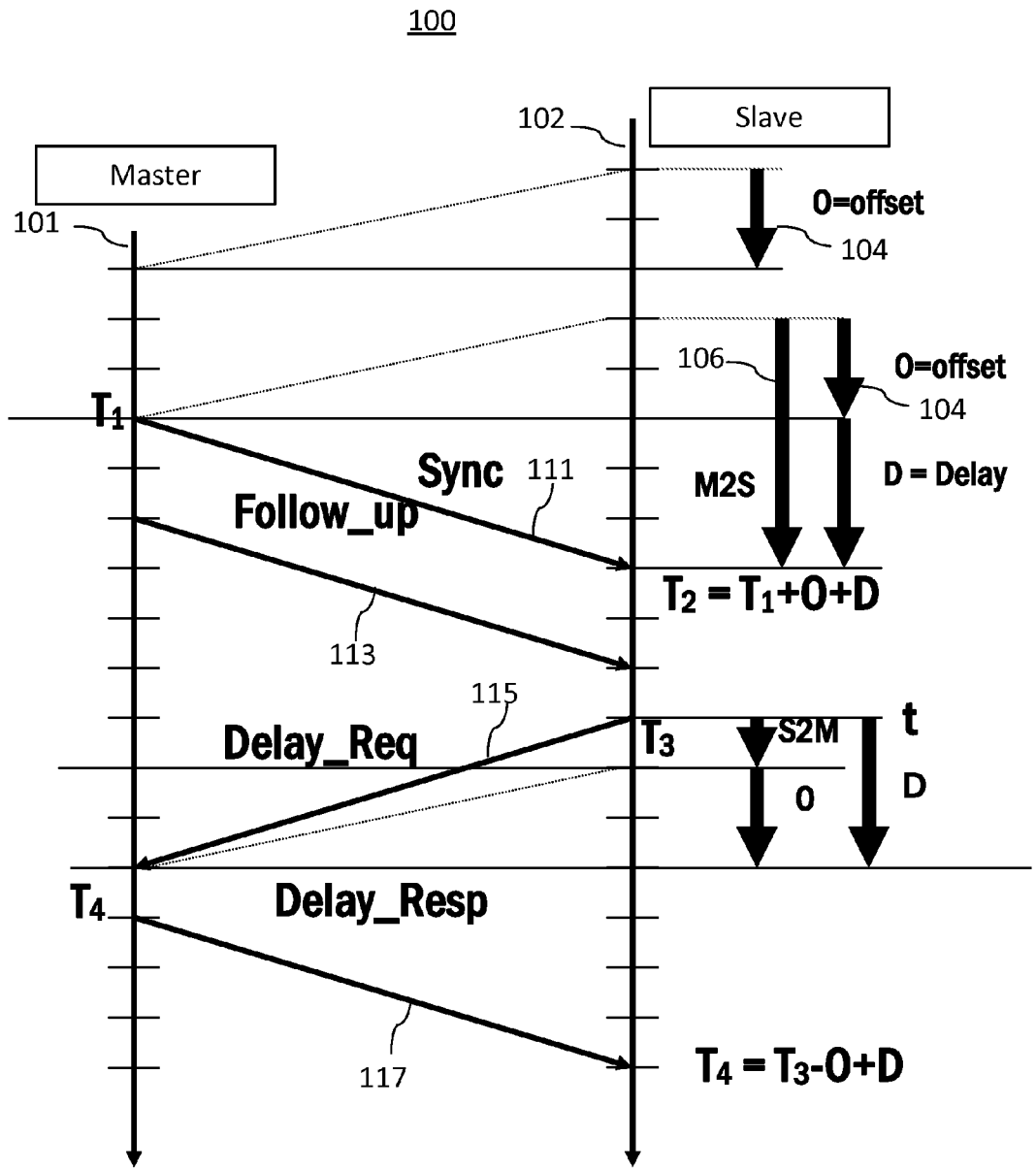
FIG. 2 is a schematic timing diagram illustrating the process of time synchronization according to a conventional PTP synchronization process.

With reference to FIG. 2, there is shown a timing diagram illustrating the conventional PTP process 100 of timing synchronization between a master device including a master clock and a slave device including a slave clock, in accordance with the IEEE 1588 Standard. It may also be referred to hereinafter as the 1588 synchronization process or the conventional PTP process. Here, a vertical line 101 illustrates the timeline of the master clock in the master device 15, which may be embodied by PRE 10 or as a separate network device, while vertical line 102 illustrates the timeline of the slave clock in the slave device such as probe 20, when probe 20 is a client of the PTP process. Initially there is an unknown time offset O between the respective clocks, as illustrated by arrows 104. The goal of the PTP process is to synchronize the slave clock to the master clock as accurately as possible, so as to minimize the slave offset O 104.

To accomplish this, the conventional PTP process makes use of four messages. The master 15 periodically sends a clear synchronization message—the Sync message (SyncM) 111—to the slave device 20. The send frequency for the Sync message 111 is configurable, e.g. 2 seconds in a basic setting but can be as frequent as once every $\frac{1}{16}$ of a second. The Sync message 111 contains a Sync command and the current time of the master clock 10 at the time of the Sync message formation. However, the time information in the Sync message 111 is not an accurate representation of the exact time when the Sync message leaves the master, since it does not account for delays within the master device such as those associated with the handling of the communication stack and the transmission of the data via the Ethernet controller. Therefore the master 15 records the actual time $T_1$ when the first byte of the Sync message 111 is transmitted out of the network interface card (NIC) port; this information, i.e. $T_1$, is sent to the slave by embedding it in the PTP payload of a second, follow-up message 'Follow_up' 113.

The slave 20 records the time instance $T_2$ when it receives the first byte of the Sync message 111. This time relates to the time $T_1$ as described by the following equation (1):

$$T_2 = T_1 + O + D, \quad (1)$$

where D is the M2S (master to slave) network time delay, also referred to as path delay, i.e. the time that the Sync packet 111 takes to travel from the master to slave.

When the slave receives the Follow Up message 113, it records down $T_1$. Next, slave 20 sends a Delay Request (Del_Req) message (DelReqM) 115 to the master 10, recording the time instance $T_3$ when the Del_Req message 115 is transmitted. When the master 15 receives the Del_Req message 115, it record the time instance $T_4$ when the first byte of the Del_Req message 115 is received by the master's NIC. Finally, the master 15 sends a Delay Response (Del_Resp) message (DelRespM) 117 to the slave, with $T_4$ embedded in the PTP payload thereof. When the slave 20 receives the Del_Resp message 117, it records down $T_4$, which completes the message exchange in one synch period. $T_4$ relates to the time $T_3$ as described by the following equation (1):

$$T_4 = T_3 - O + D, \quad (2)$$

where it is assumed that the slave-to-master (S2M) network delay is equal to the M2S delay denoted as D. Equations (1) and (2) can be easily solved to determine the slave offset O and the network delay D:

$$O = [(T_2 - T_1) - (T_4 - T_3)]/2 \quad (3)$$

$$D = [(T_2 - T_1) + (T_4 - T_3)]/2 \quad (4)$$

The slave then corrects its clock by the computed value of the offset O, so that the slave clock becomes synchronized to the master clock. This completes one synch period. In practice, average values of the offset O obtained over a number of synch periods may be used in a servo control loop for the slave clock.

U.S. Patent Application 2013/0170507, published Jul. 4, 2013 and assigned to the assignee of the present application, discloses a variation of the conventional PTP procedure that reduces the number of time synchronization messages in a time-sync period from four to three by eliminating the FollowUp message and combining T3 and T1 data in a same message.

When a probe 20 sends messages with measurement data or other network service related data to the PRE 10, it timestamps these messages with a relevant time recorded from the probe's internal clock. As a result of the aforedescribed PTP process or its variants, in which the internal clock of the probe 20 is actively synchronized with the master clock 15, these timestamps are also synchronized with the internal clock of PRE 10, as required for many network testing tasks so that relative timing of various events across the network may be accurately assessed.

Advantageously, according to an aspect of the present invention, the same result may be achieved without the active clock synchronization of probes 20 to the master clock 15, as described hereinbelow for several exemplary embodiments.

Figure 3:
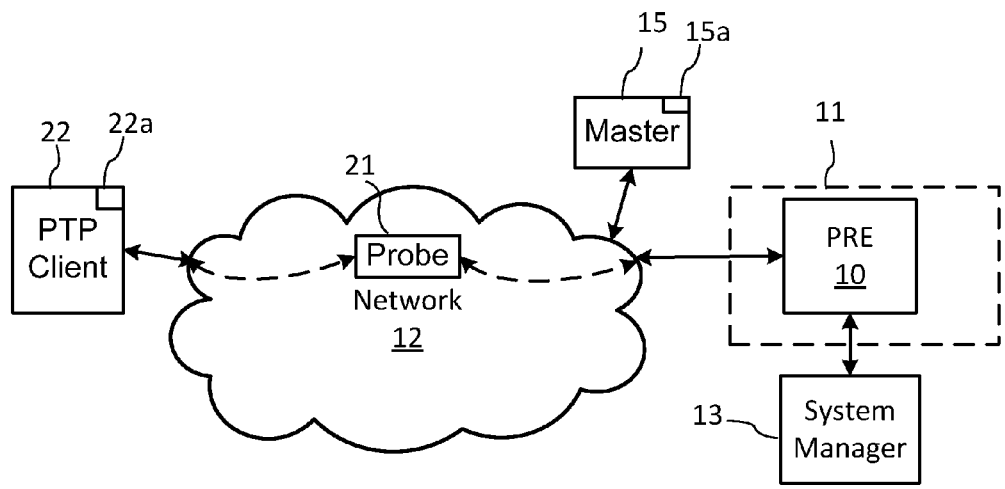
FIG. 3 is a schematic diagram illustrating a distributed monitoring and testing system for a communication network including a probe with a free running clock.

Referring first to FIG. 3, there is illustrated an exemplary embodiment wherein probe 21, which may be an embodiment of probe 20, is connected within network 12 so that it can relay network messages on their way from a source network device to a destination network device, such as a PTP client device 22 having a clock 22a, and can exchange messages with the test server 11 to perform network testing tasks, sending test results to the test server 11. It can also filter relayed messages according to pre-defined criteria, optionally process filtered messages, and insert probe-generated messages into network traffic. The network 12 further includes a master device 15 including a master clock 15a, hereinafter referred to as the master 15. In some embodiments, the master device 15 may be incorporated within the test server 11.

Figure 4:
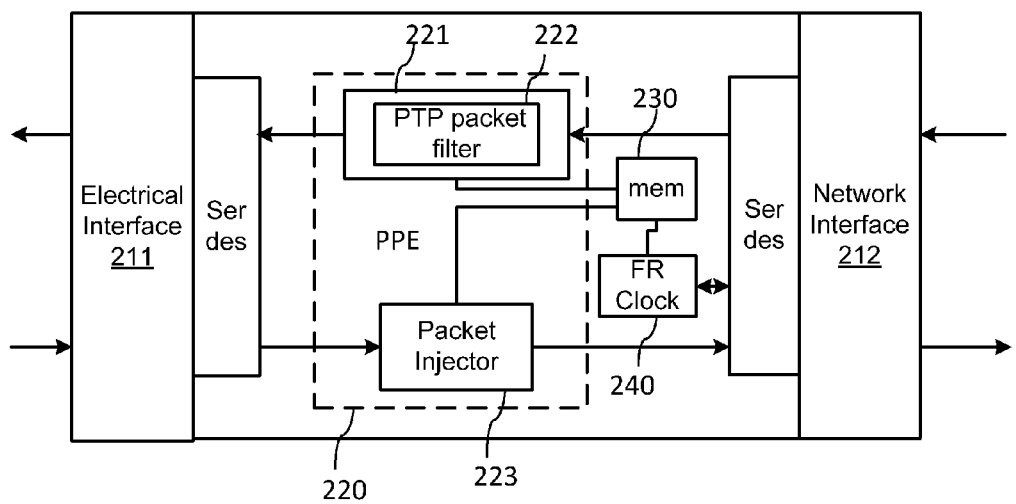
FIG. 4 is a schematic block diagram of a timing packet processing sub-system of a probe with a free running clock.

With reference to FIG. 4, the probe 21 in one embodiment thereof may include a packet processing engine (PPE) 220 that is operatively connected between a network interface 212 and an electrical interface 211. In the case of a fiber-optic network, the network interface 212 may be an optical interface and may include, as known in the art, a laser diode based transmitter on the transmit side and a photodiode on the receive side, which are not shown. The electrical interface 211 is for connecting to a host controller (not shown), which may be a part of a network element at which probe 21 is connected, and optionally for relaying network traffic dropped at the site to its destination, for example by means of another probe connected at the same site. Each or one of the electrical interface 211 and network interface 212 may be followed by, or include, a serializer/deserializer (SerDes) as known in the art. The PPE 220 includes, on the receive side, programmable packet filters 221 for filtering received packets according to pre-programmed criteria; filtered packets may then be copied, fully or in part, and relayed or terminated as known in the art. A memory device 230 is further provided for storing data extracted from the received packets, or the whole packets. Test data and other desired data stored in memory 230 may then be injected into the network traffic as test packets or filtered results packets (FRPs) by a packet injector 223. The probe 21 further includes a free running (FR) internal, or local, clock 240 providing a clock signal for local synchronization of various probe components and circuits, and also providing timing reference for time-stamping injected test packets. The PPE 220 and, optionally also the FR clock 240, may be implemented within an ASIC for the purposes of miniaturization, although those skilled in the art will appreciate that in other embodiments the same functionalities may also be embodied also using other types of digital processors and computing and memory devices such as but not exclusively general purpose processors, specialized microprocessors, DSP, FPGA, or any combination thereof, and also using network cards and various memory devices.

Figure 5:
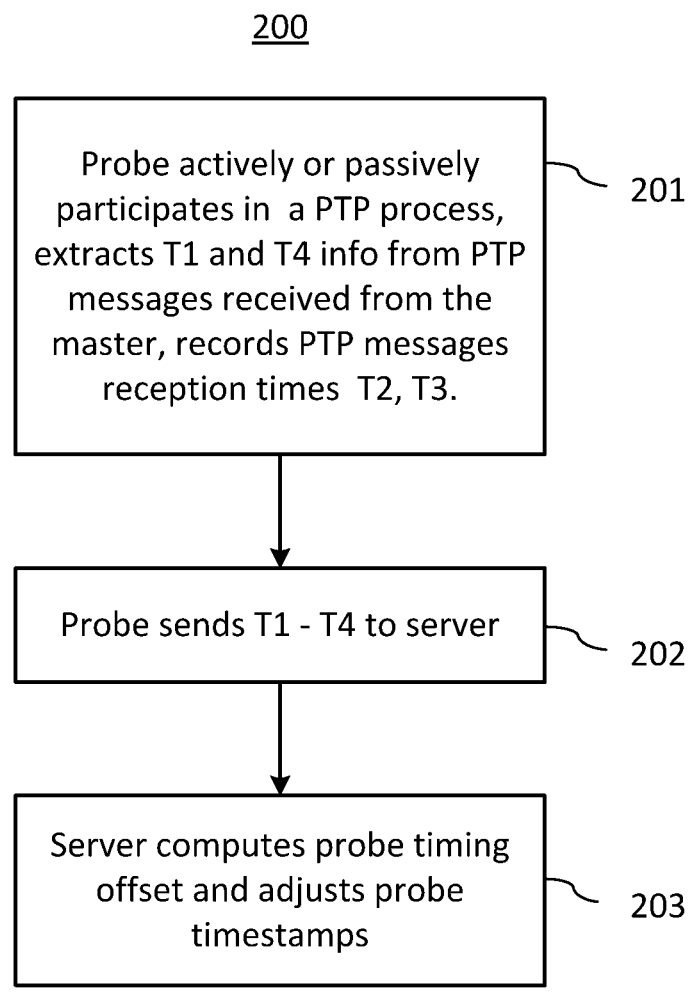
FIG. 5 is a general flowchart of a process of a remote probe packet timestamp synchronization according to an embodiment of the present invention.

Turning now to FIG. 5, an aspect of the present invention provides a method 200 of tracking time of the free running clock 240 of a network probe, such as probe 20 of FIG. 1 or probe 21 of FIG. 4, in the network 12 that also includes the remote test server 11 which receives network test messages from the network probe, and a master device 15 including the master clock 15a. Method 200, which can also be viewed as a method of correlating probe packet time to the master clock, generally includes the following steps or actions:

At 201, network probe 21 participates in an exchange of timing messages with the master device 15, wherein the network probe obtains, from timing messages received from the master 15, information indicating master clock times T1 and T4 when a first timing message was transmitted by the master and a second timing message was received by the master, respectively, and wherein the network probe records probe clock times T2 and T3 when the first timing message was received by the probe 21 and the second timing message was transmitted, or relayed, by the probe 21, respectively.

At 202, the network probe 21 transmits T1, T2, T3, and T4 values to the remote test server 11, for computing thereat at step 203 a probe time offset O and for adjusting probe timestamps of the test messages received by the server 11 to synchronize those timestamps with the master clock 15a.

In an embodiment wherein Master 15 implements a version of the 1588 PTP protocol, the first timing message is the 'Sync' message 111, and the second timing message is the 'Delay Request' message 115.

Figure 6:
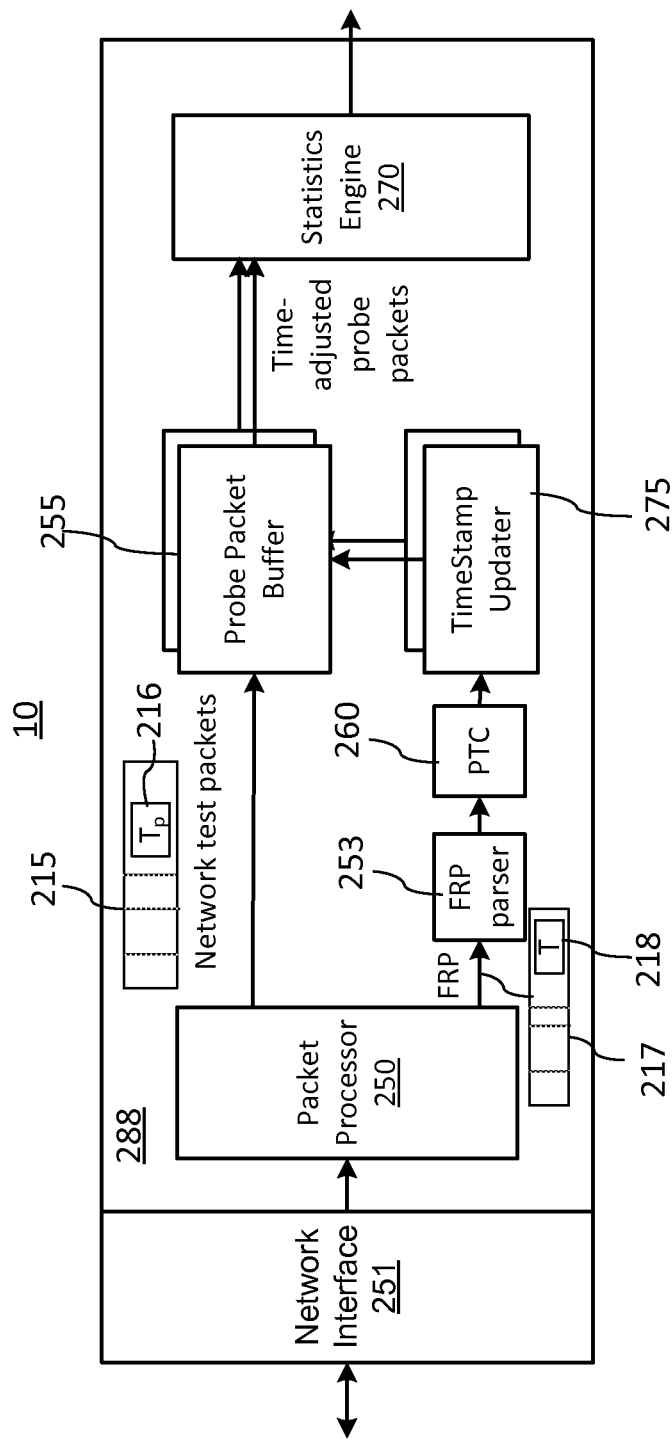
FIG. 6 is a schematic block diagram of a packet timing synchronization sub-system of a test server.

Turning now to FIG. 6, there is illustrated an exemplary embodiment of the PRE 10 of the test server 11 that is configured to participate in the probe time tracking process 200 and to adjust the probe timestamps of test packets received from probe 21, to synchronize them to a time line of the master clock device 15. In the illustrated embodiment, PRE 10 includes a network interface card (NIC) 251 coupled to a digital processor 288, which is programmed or otherwise configured to implement, together with the probe 21, various steps of the method of the present invention in at least one embodiment thereof as described hereinabove with reference to FIG. 5 and hereinbelow with reference to FIGS. 7-11. The digital processor 288 may be, for example, a central processing unit (CPU) of a suitable computing device, such as for example a personal computer or a server computer, and may incorporate one or more computer-readable memory devices. Generally it can be embodied using a single hardware processor or multiple hardware processors. The term hardware processor as used herein encompasses general purpose processors, digital signal processors (DSP), microcontrollers, ASIC, FPGA, etc. Various modules or elements shown in FIG. 6 as blocks within the processor 288 may be implemented using dedicate hardware logic circuits, in software code that is saved in memory associated with the processor 288 and executable by the processor, or as a combination thereof.

Continuing to refer to FIG. 6, NIC 251 connects to a packet processor 250, which may include a protocol stack, an encryption/decryption engine and a packet parser as known in the art, and generally includes one or more packet filters for filtering out packets in accordance with one or more pre-defined criteria. The protocol stack used by PRE 10 may be, for example, a UDP protocol stack as defined in IEEE-1588 Standard, although alternative implementation of the protocol stack could also be envisioned by those skilled in the art and are within the scope of the present invention. An output device or devices may further be provided to output synchronization and network related information for the benefit of a user of the NMTS 5, such as for example information related to the FR probe clock time relative to the master clock time as further described hereinbelow. The packet processor 250 identifies in the received packet stream test packets 215 originated from probe 21, which include the probe timestamp 216 encoded in one of the packet fields, and passes said packets to a probe packet buffer (PPB) 255 configured for temporary storing thereof. The packet processor 250 also identifies in the received packet stream probe timing packets 217 from probe 21, such as timing FRPs 115 and 'Inject ACK' packets 119 described hereinbelow with reference to FIGS. 8 and 9, which carry probe timing data 218 with one or more probe-relevant T1-T4 values, and passes said packets 217 to probe timing packets parser 253 for extracting therefrom the probe timing data 218 containing T1, . . . T4 value. The probe timing data 218 is then passed to a probe time computer (PTC) 260. PTC 260 uses the probe timing data to compute the time offset O of the FR clock 240 of probe 21 relative to the master clock 15a, and passes this information to a time stamp updater 275, which updates the timestamps 216 of the test packets stored in PPB 255 so as to synchronize them with the master clock timeline. As PRE 10 may be collecting test packets from a plurality of probes having free-running internal clocks, a plurality of packet buffers 255 and timestamp updaters 275, one for each free-running probe, may be configured, e.g. programmed, within the PRE 10. Time-adjusted test packets may then be forwarded from the PPB 255 to a statistics engine 270 for generating results related to network statistics. The statistics engine 270 may be either a part of the PRE 10 or the test server 11, or may reside remotely on another server or a network connected computer.

Advantageously, this "a posteriori" timing synchronization process avoids the need to actively drive the local probe clock 240 to synchronize it with the master 15, while still ensuring a correct time-stamping of probe packets at the server 11, i.e. that the probe packet timestamps are synchronized with the master clock 15a timeline. In some embodiments, probe 21 does not have to be an active party of a PTP process with the master device 15 as described hereinabove with reference to FIG. 2, but may instead passively participate in it by 'eavesdropping' on PTP messages that are exchanged between the master 15 and the remote PTP client 22, and which are relayed by the probe 21. Thus, in the context of the present application, participation in an exchange of timing messages may mean an active participation, when the probe is a PTP client and operates as a slave to the master 15, and an indirect, 'passive', or 'hidden' participation when the probe eavesdrops on the timing messages exchange between the master 15 and a slave device defined in the network, such as the PTP client device 22 in FIG. 3.

This probe timing tracking process (PTTP) 200 will now be described with reference to FIGS. 7-11, which show flowcharts of a few exemplary embodiments thereof and their associated timing diagrams, together with aspects of operation of the probe 21 and PRE 10 that relate to the probe timing tracking process.

Figure 7:
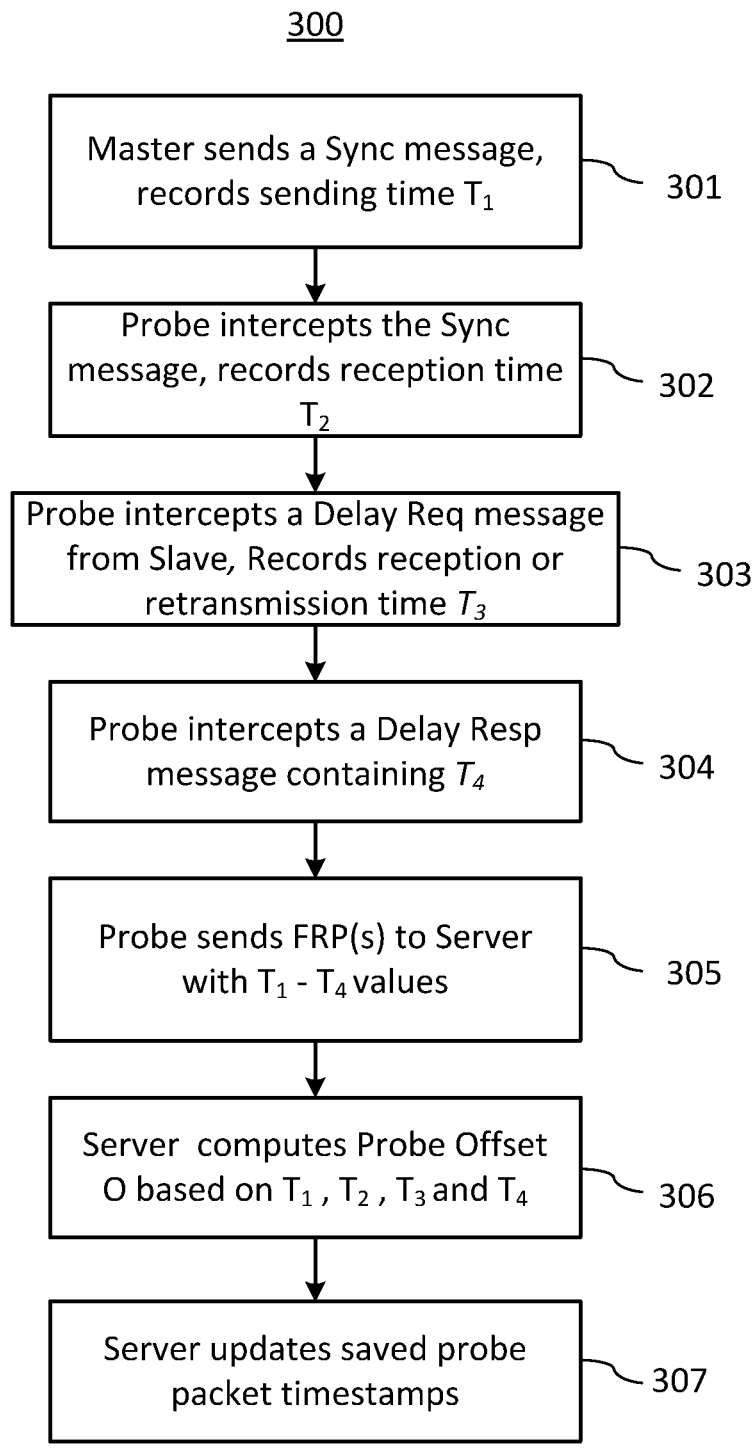
FIG. 7 is a flowchart illustrating the process of packet time synchronization wherein the probe eavesdrops on a master-slave PTP message exchange.
Figure 8:
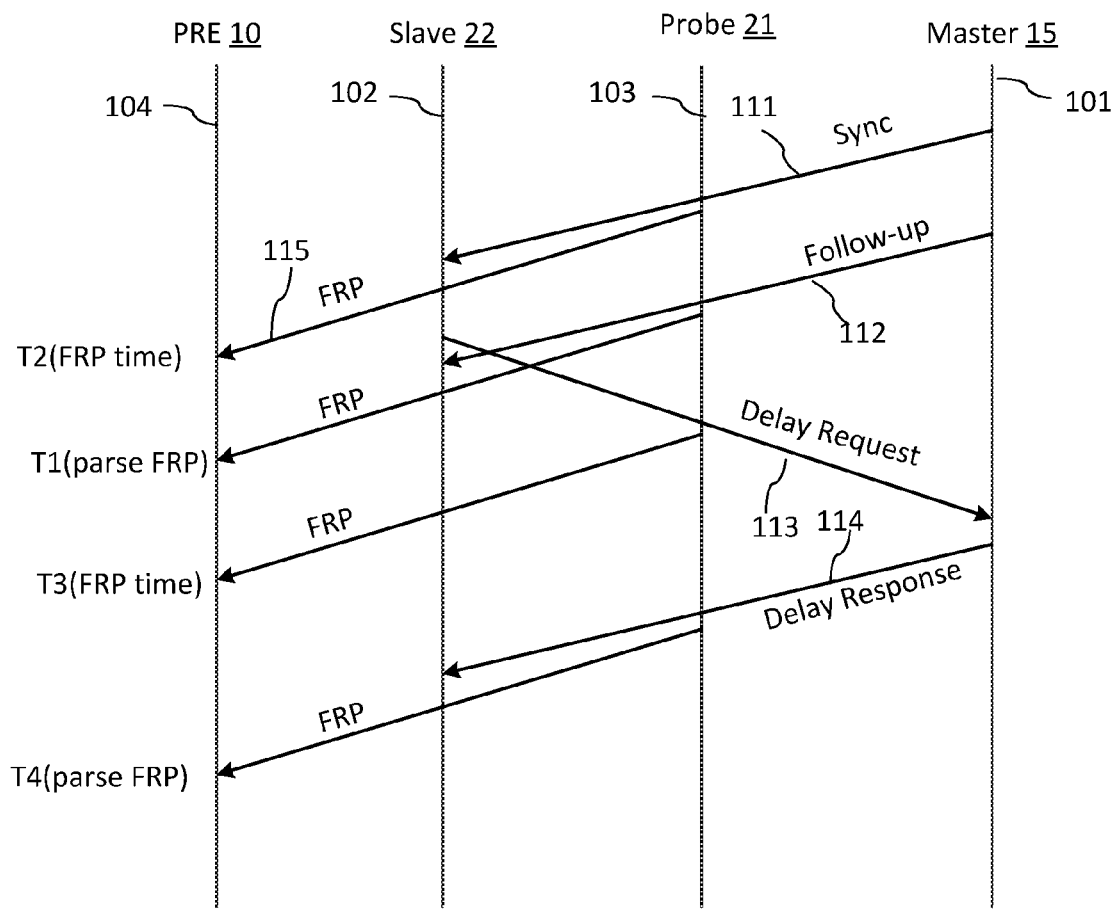
FIG. 8 is a schematic timing diagram illustrating an exchange of timing messages in the process of packet time synchronization of FIG. 7.

Referring first to FIGS. 7 and 8, in one embodiment the probe 21 is not a direct party of a PTP process, and may or may not be a member of a PTP multicast group of the master 15. Instead, probe 21 eavesdrops on multicast PTP messages sent from master 15 to other network connected devices such as the PTP client device 22, which is shown in FIG. 3 and may be in the form of a network probe 20 or another network connected device. In the context of the PTP process, the PTP client device 22 operates as a slave to master 15 and exchanges PTP messages therewith, generally as described hereinabove with reference to FIG. 2, with the probe 21 relaying these messages to their destinations. In one embodiment, the probe 21 may not be in a direct communication path between the master 15 and the slave 22, but may be a member of a multicast group that receives the PTP messages from both the master 15 and slave 22. In FIG. 8, lines 101 to 104 schematically show local timelines of the master clock 15, slave 22, probe 23, and PRE 10, with arrows showing timing messages sent and received in relation to said timelines.

Turning now to FIG. 7 while continuing to refer to FIGS. 8 and 3, there is illustrated a process 300 for tracking the time of the FR clock 240 of the probe 21, and/or for correlating probe generated timestamps 216 at the test server 11 to the master clock 15a, by eavesdropping on the PTP messages 111-114 between the master 15 and the PTP client 22, which operates as slave. In one embodiment, the probe 21 may be in the communication path between the master 15 and the slave 22, relayed the PTP messages therebetween. In one embodiment, probe 21 may not be in a direct communication path between the master and the slave, but may be receiving PTP messages as a member of a multicast group. Referring back to FIG. 4, the probe 21 has a PTP packet filter 222 that is configured, e.g. pre-programmed, to identify PTP packets among packets received from the network, and in particular to identify PTP packets, such as for example the Follow Up packets 112 and the Delay Response packet 114, containing relevant PTP information including the times T1 and T4 of PTP packets transmission or reception by the master. This information is then saved in a timing or PTP memory 230.

Continuing to refer to FIG. 7, the process starts after step 301, at which the master 15 sends the first timing message, such as the 'Sync' message 111 in the embodiment compatible with the IEEE 1588 PTP standard, to members of its PTP multicast group, including to the slave 22 via the probe 21; the 'Sync' sending time T1 recorded by master 15 may then be sent to the slave 22 via the probe 21 in a follow up message 112, which in some embodiments may be combined with a Delay Response message 114.

At step 302, the probe 21 receives the Sync message 111 on its way to the slave 22, and records in memory 230 the reception time of the Sync message according to its FR clock 240 as T2.

When the slave 22 receives the first, or Sync, message, it responds by sending the second timing message, such as the Delay request message 113, back to the master 15. At step 303, probe 21 intercepts this Delay request message 113 and relays it forward to the master 15, recording in memory 230 the time of its reception at the probe or re-transmission to master 15 according to its FR clock 240 as T3.

At step 304, probe 21 captures, e.g. makes a copy of it prior to relaying it to its destination, a third timing message carrying the time T4 of the reception of the second timing message 113 by the master, for example on its way from master 15 to slave 22, or as a multicast packet, and records data containing the T4 value in memory 230. In one embodiment, this third timing message is the Delay response message 114, and contains information about the time T4 of the reception of Delay Response message 113 by the master. The probe 21 also captures a PTP packet carrying the T1 time from the master to the slave, and saves relevant information in memory 230. In on embodiment, this PTP packet is the Follow-Up packet 112, as illustrated in FIG. 8. In another embodiment, T1 may be carried in the payload of the Sync packet 111. In yet another embodiment, T1 may be sent together with the T4 in the Delay Response packet 114.

In one embodiment, the whole PTP packets with the relevant timing information may be saved in memory, such as the Follow-up packet 112 carrying T1 in its payload and the Delay Response packet 114 carrying T4 in its payload. In another embodiment, the PTP packets could be parsed, e.g. stripped of all or some of their headers, and a portion of the packet or of its payload containing the time values is saved, or only the time values T1 and T4 themselves are extracted or saved.

At step 305, probe 21 sends one or more messages to the test server 11 with information containing the T1, T2, T3 and T4 values as saved in the probe memory 230, for example in the form of one or more filtered results packets (FRP) 115.

In the embodiment illustrated in FIG. 8, the probe 21 sends a first FRP 115 time-stamped with the probe time T2 when the probe 21 received the Sync packet 111, sends a second FRP 115 containing the Follow-Up packet 112 or a portion thereof with T1, then sends a third FRP 115 time-stamped with the probe time T3 when the probe 21 received the Delay request packet 113, and then sends a fourth FRP 115 with the DelayResponse packet 114 or a portion thereof containing T4 when the probe 21 received DelayResponse packet 114. In another embodiment, some or all of the T1-T4 values may be combined and sent to the server 11 in a single message or packet.

At step 306, sever 11 receives one or more packets with the T1-T4 values and computes from these time values the probe clock offset O, for example using equation (3) given hereinabove. In one embodiment, the packet processor 250 of PRE 10 of FIG. 6 identifies in the received packet stream probe timing packets 217 that came from probe 21, such as for example the FRPs 115 carrying probe timing data 218, which contains the T1-T4 values for the probe 21, and passes said packets 217, or the probe timing data 218 extracted therefrom, to the PTC 260. PTC 260 uses the probe timing data, and in particular the T1-T4 values to compute the time offset O of the FR clock 240 of probe 21. This probe time offset O, and a corresponding master clock time value, is then passed to a time stamp updater 275, which at step 307 updates the timestamps 216 of the test packets stored in PPB 255 so as to synchronize them with the master clock timeline. In one embodiment, multiple data points, such as multiple sets of T1, . . . , T4 values, may be processed by the time stamp updater 275 using suitable statistical techniques, such as for example data fitting, prior to updating the timestamps to reduce the effects of a network delay jitter by effectively averaging out the network delay jitter related noise in individual offset values computed based on a single set of the timing values T1, . . . , T4.

Time-adjusted test packets 215 or portions thereof may then be forwarded from PPB 255 to the statistics engine 270 for generating results related to network statistics. The statistics engine 270 may be either a part of PRE 10, or may reside remotely on another server or a network connected computer.

Figure 9:
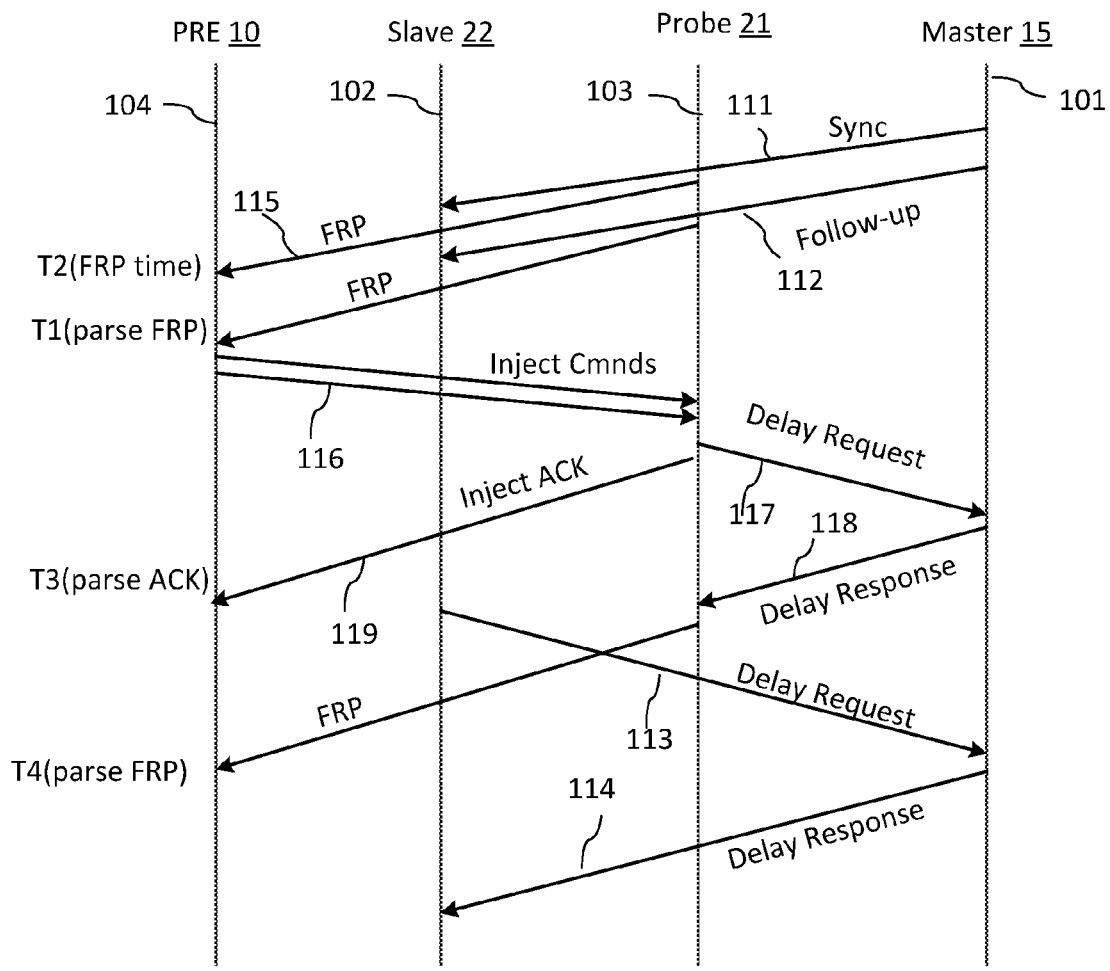
FIG. 9 is a flowchart illustrating the process of packet time synchronization wherein the probe eavesdrops on master-generated PTP messages to a remote slave and generates PTP messages to the master in response thereto.
Figure 10:
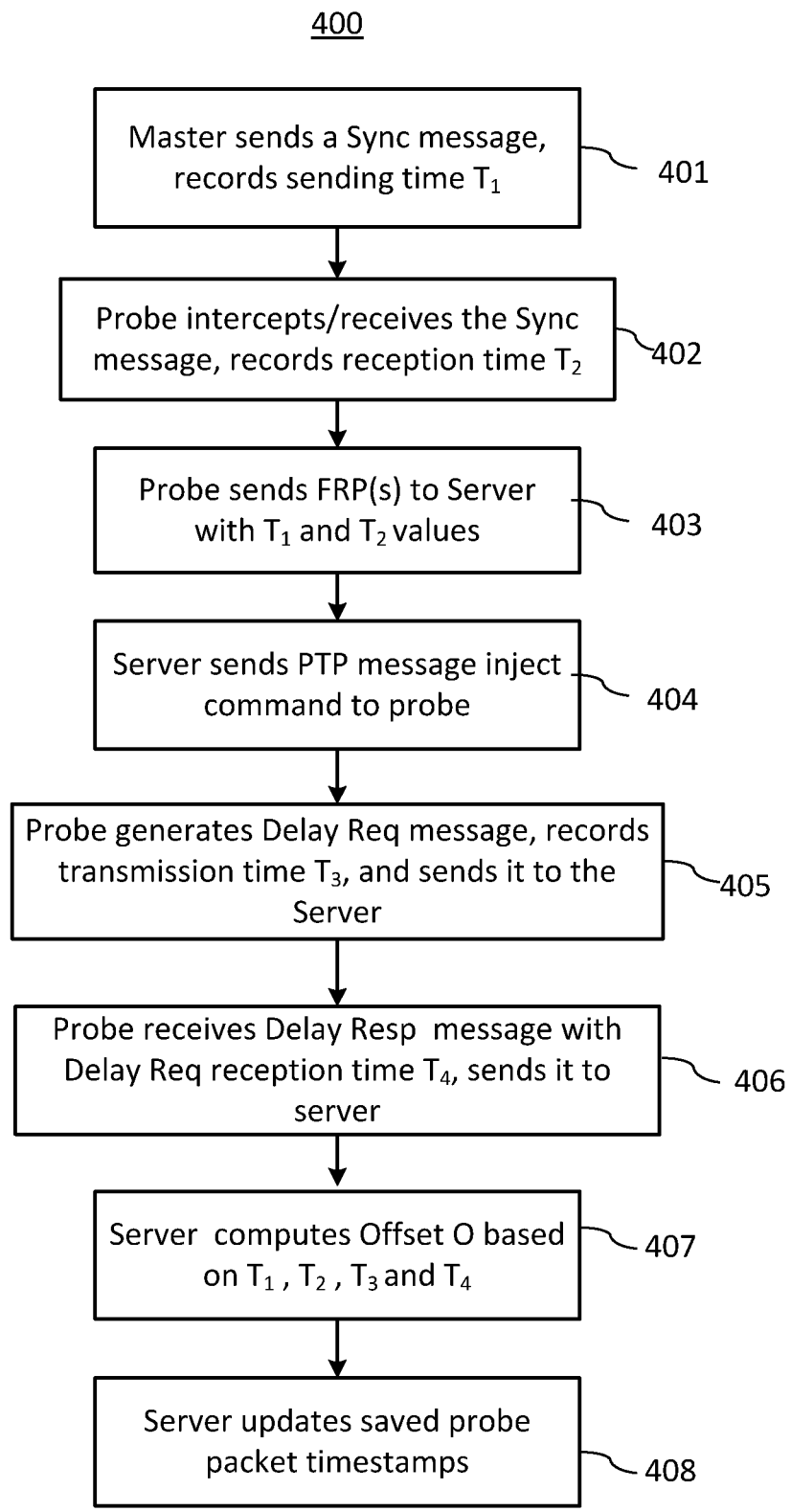
FIG. 10 is a schematic timing diagram of timing messages sent and received in the process of FIG. 9.

Turning now to FIGS. 9 and 10, in another embodiment probe 21 eavesdrops only on the initial stage of the master-slave PTP communication between the master 15 and the slave 22, by capturing the timing messages generated by the master 15 such as the first timing message, or Sync, 111 and optionally the Follow-Up message 112, but then generates its own Delay Request message 117 to the master 15, recoding the time of sending message 117 as T3. In one embodiment, the generation of the Delay Request message 117 by the probe 21 is done responsive to an 'Inject Commands" message 116 from the test server 11.

Referring in particular to FIG. 10, in this embodiment at step 401 the master 15 sends a 'Sync' message 111 to members of its PTP multicast group, including to the slave 22 via the probe 21; the 'Sync' sending time T1 recorded by the master 15 is then sent to the slave 22 via the probe 21 in the follow up message 112.

At step 402, the probe 21 receives Sync message 111 on its way to the slave 22, captures it, and records in memory 230 the reception time of the Sync message according to its FR clock 240 as T2.

At step 403, the probe 21 sends one or more FRPs to the test server 11 with a timestamp T2 and containing at least a portion of the Follow-Up message with T1 value therein. At step 404, the server 11 sends a "PTP inject" message 116 to the probe, with a command to inject a "Delay Request" message addressed to the master 15 in the traffic stream.

At step 405, the probe 21 generates the "Delay Request" message 117 and injects it into the traffic stream to be send to the master 15, records the sending time as T3, and sends it to the server 11. In one embodiment, the probe sends an "Inject Acknowledged" message 119 to the server, time-stamping it with T3 or having T3 value in its payload.

At step 406, the probe 21 receives a Delay Response message 118 from the master 15, which contains the master time T4 when the "Delay Request" message 117 was received, and sends the Delay Response message 118, or a portion thereof with the T4 value, to the test server 11.

At steps 407 and 408, the sever 11 computes from these time values T1-T4 the probe clock offset O, and updates the test packets timestamps saved at the server, for example as described hereinabove with reference to FIGS. 6 and 7. In one embodiments, step 407 or 408 may include processing a plurality of the probe offset values O, for example a historical record thereof, to reduce the noise related to the network delay jitter.

Figure 11:
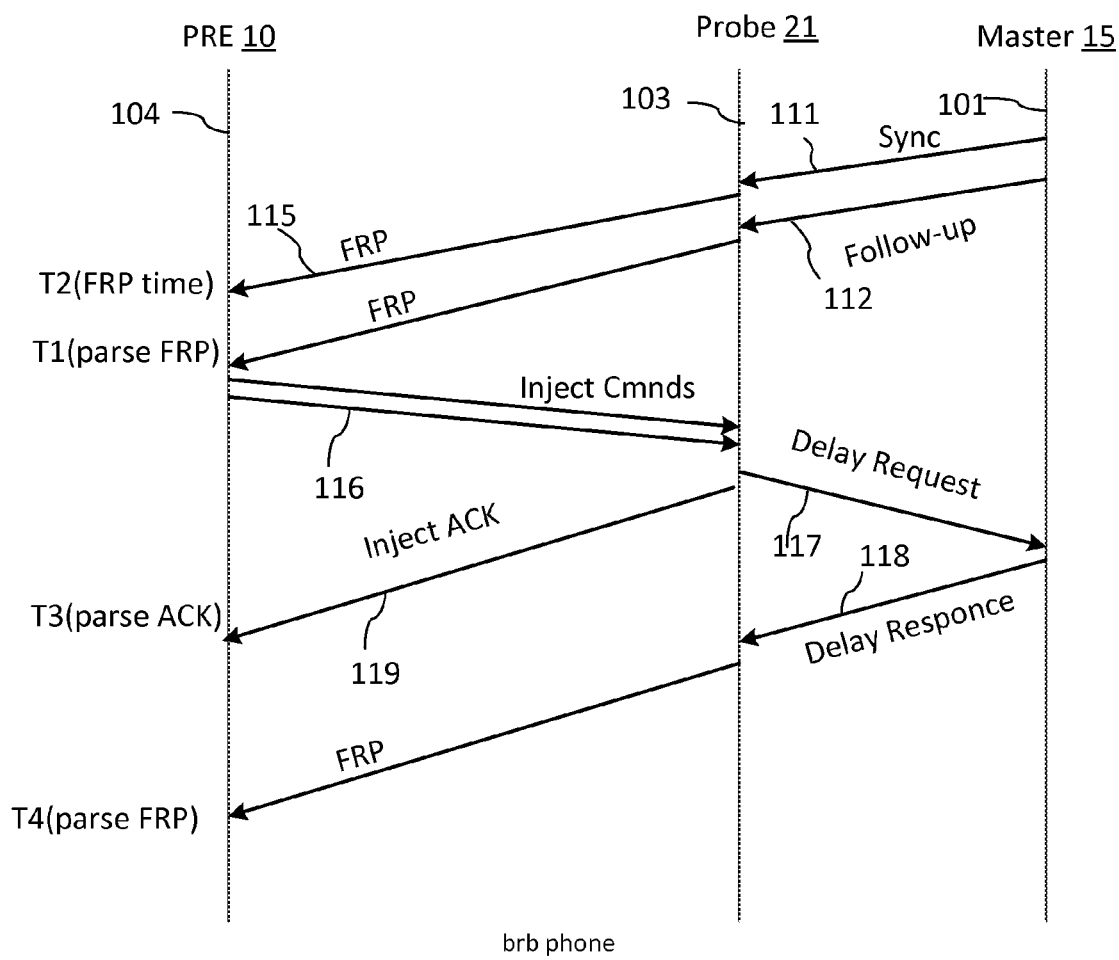
FIG. 11 is a schematic timing diagram illustrating the process of packet time synchronization wherein the free running probe communicates with the master device as a PTP client without updating the probe clock.

Turning now to FIG. 11, in one embodiment the remote client 22 may or may not be present in the proportion of the network to which the probe 21 relays network traffic. For example, in this embodiment probe 21 may be plugged into a switch or router, or a port thereof, which is not forwarding the multicast 1588 PTP packets. In this embodiment, the probe 21 sends a request to the master 15 to join a PTP multicast group for 1588 PTP packets to receive the multi-cast Sync and optionally FollowUp messages 111, 112. Once the probe 21 receives the Sync and FollowUp messages, it may send the FRP messages 115 to the test server 11, or the PRE 10, with the master clock time T1 and the probe clock time T2 as described hereinabove. For example, the probe may send the first FRP 15 timestamped with the probe time T2 upon receiving the Sync packet 111, and then send the second FRP 15 with the FollowUp packet 112, or a T1 relevant portion thereof, to the PRE 10. The PRE 10 then may send to the probe 21 one or more packets 116 with the "PTP packet Inject" command therein, upon receiving which the probe 21 generates the "Delay Request" packet 117 and injects it into the network traffic with the master 15 destination address, sending the "inject Acknowledge" message 119 to the PRE 10 timestamped with the time of the Delay Request transmission T3. Upon receiving the Delay Response packet 118 from the master 15, the probe 21 sends an FRP to the PRE 10 with the Delay Response packet 118, or a portion thereof containing the master clock time T4 of the reception of the "Delay Request" packet 117.

FIGS. 7-11 illustrate one cycle of the probe time tracking process, in which the probe clock time offset O is obtained for a particular master clock time segment between T1 and T4. In the conventional PTP process of FIG. 2, one time synchronization cycle generating the four time values T1, . . . , T4 is periodically repeated, each starting with the master 15 generating the Sync message and ending with the master 15 sending the Delay Response message, to continu-ally update the slave clocks. Similarly, in one embodiment of the time tracking method of the present invention each Sync packet captured by the probe 21 may trigger a repeat of the steps of FIGS. 5, 7 and 10, resulting in the probe sending the T1, . . . , T4 values to the test server 11 for each cycle of the PTP synchronization, and the PRE 10 comput-ing for them the probe clock time offset O. In one embodi-ment, the probe 21 may react only to a subset of received Sync packets.

Figure 12:
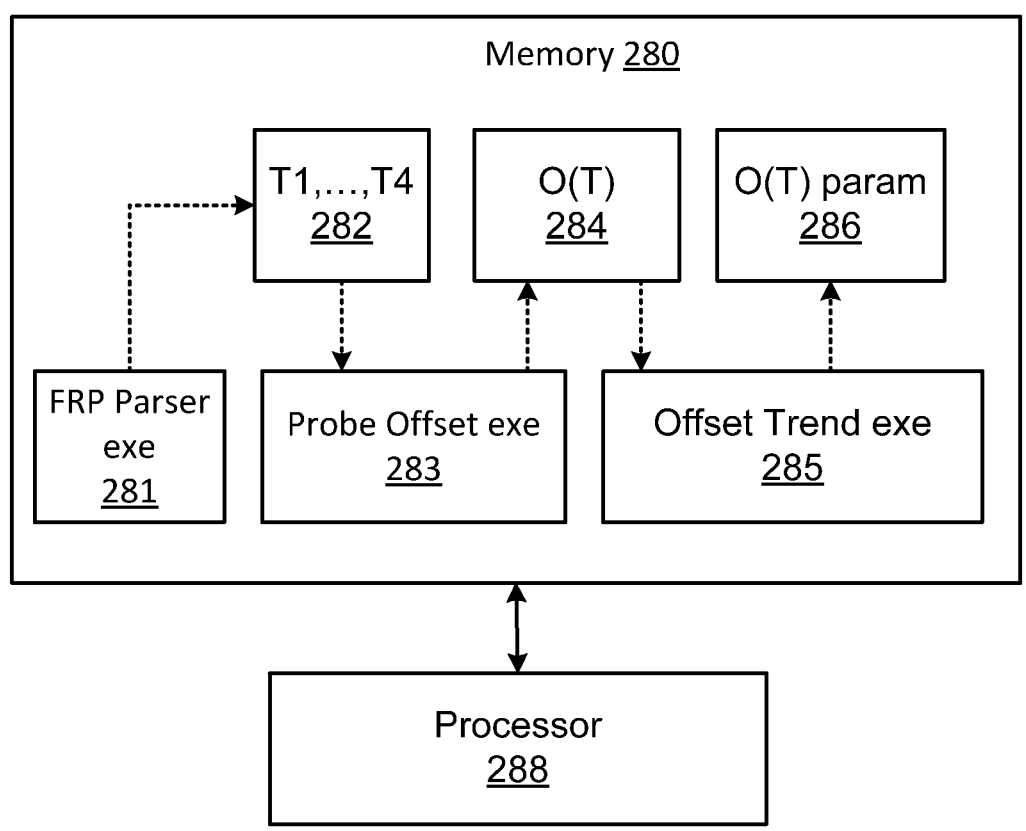
FIG. 12 is a schematic block diagram of a computer subsystem of the test server for probe timing tracking.

Turning now to FIG. 12, in one embodiment the processor 288 of the PRE 10 may be programmed to use a historical record of the timing offsets O of the FR probe clock in dependence on the master clock time T1 or T4, or a combination thereof, or on the probe clock time T2 or T3, or a combination thereof, to compute one or more parameter defining an approximate functional dependence of the probe timing offset on the master clock time.

As schematically illustrated in the figure, in one embodi-ment processor 228 of PRE 10 is operatively coupled to a memory 280, which includes processor-executable program-ming modules 281, 283, 285, and timing data modules 282, 284, 286. Here the term 'operatively coupled' encompasses embodiments wherein the memory 280, or a portion thereof, is defined within the processor 288. Programming module 281 includes processor-executable code for parsing received probe timing FRPs to extract therefrom probe timing data, and for storing probe timing data T1, . . . , T4 in the first timing data module 282 for each PTP synchronization cycle.

Programming module 283 includes processor-executable code for computing the probe timing offset O for each PTP synchronization cycle, and for storing this offset in the second timing data module 284 in dependence upon a master clock time or a probe clock time for a corresponding PTP synchronization cycle. By way of example, every time memory 282 stores all four time values, the probe offset computing executable 283 can generate, and save in memory 284, a data point (T3, O) indicating that at time T3, i.e. the probe time that the Delay Request packet was sent by the probe to the master, as read from the probe's free running clock, the probe's clock time had an offset from the master clock time of value O.

By way of example, when probe 21 is eavesdropping on a single 1588 client, one of these data points may be generated every second and saved in a memory 284. In the conventional 1588 PTP process, this data point is used to adjust the clock of the 1588 client trying to match the 1588 master's clock. Instead, in the method of the present inven-tion an internal computer of the PRE 10 may be programmed to use a collection of these points saved in memory 284 to characterize the drift of the probe's free running clock 240 from the 1588 master clock 15a.

In one embodiment, the programming module 283 gen-erates and saves in memory 284 a collection of data points such as $(T3_0, Offset_0), (T3_1, Offset_1), \ldots, (T3_n, Offset_n)$.

By characterizing these data points, a suitably pro-grammed processor can generate an equation, or a set of parameters defining it, that maps the time of the probe's free running clock to it's offset from the master clock at that particular time.

By way of example, in one embodiment the programming module 283 includes processor-executable code for gener-ating a linear fit or a trend line for a plurality of (T3, O) points using the least squares line fitting. This trend line is given by an equation of the form:

$$Offset_i = T3_i * slope + intercept$$

Or, for the time elapsed since a first T3 value $T3_0$ was captured, $$Offset_i = (T3_i - T3_0) * slope + intercept$$

The linear trend approximation may be suitable to approximate the probe time offset behavior when the FR clock of the probe has an approximately constant drift. In other embodiments, the programming module 285 may use the historical record 284 of the timing offsets of the probe clock in dependence on the master clock time or the probe clock time to compute several parameter defining an approximate functional dependence of the probe timing offset on the master clock time, for more complicated functions such as a higher order polynomial or other suitable functions as known in the art of data fitting.

It will be appreciated that one or more of the programming or memory units shown as blocks in the memory device 280 may be configured within the processor 288 using hardware logic circuits and registers.

Advantageously, the probe time tracking method of the present invention, at least in some exemplary embodiments thereof as described hereinabove, enables to avoid constantly sending SOCP timing commands between the test server, such as PRE 10, and the probe. Furthermore, in large network were some of the probes may be far away from the test server thereby potentially leading to a large jitter in a conventional PTP process where the test server provides the master clock, it enables to allocate a master clock closer to the probes thereby reducing the detrimental effect of the network delay jitter on the accuracy of the probe packet timestamps at the test server. Furthermore, at least some embodiments of the probe time tracking method of the present invention do not require the network operator to do any additional traffic prioritization for newly added probes to support the PTP, as such probes may simply be eavesdropping on the existing PTP traffic in the network.

It will be appreciated that, although exemplary embodiments of the invention have been described hereinabove with reference to a network probe, the invention is also applicable to other network-connected devices having a free-running internal clock and which may be receiving or relaying timing packets from a master clock device.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

I claim:

1. A method for correlating time of a free running clock in a network probe to a master clock the method comprising:
   receiving, by a remote test server, network test messages from the network probe and a master device comprising the master clock;
   obtaining, by the remote test server from the network probe, timing messages received by the network probe from the master device, the timing messages comprising values of master clock times T1 when a first timing message was transmitted by the master device and T4 when a second timing message was received by the master device;
   receiving, by the remote test server from the network probe, probe clock time values T2 when the first timing message was received by the network probe from the master device and T3 when the second timing message was transmitted by the network probe to the master device,
      wherein the first timing message is addressed by the master device to a slave device disparate from the network probe, and T2 is the probe clock time of arrival of the first timing message at the network probe;
   computing, by the remote test server, a probe time offset O based on the T1, T2, T3 and T4 values; and
   adjusting, by the remote test server, probe timestamps of the network test messages based on the probe time offset O such that the probe timestamps synchronize with the master clock.

2. The method of claim 1, further comprising:
   repeating, by the remote test server, the steps of obtaining the timing messages comprising the values of the master clock times and receiving the probe clock time values for a plurality of timing message exchanges, and wherein the remote test server records the timing offset of a probe clock in dependence on the master clock time.

3. The method of claim 2, further comprising:
   using, by the remote test server, a historical record of the timing offsets of the probe clock in dependence on the master clock time or the probe clock time to compute one or more parameters defining an approximate functional dependence of the timing offsets of the probe clock on the master clock time.

4. The method of claim 3, wherein using the historical record of the timing offsets of the probe clock further comprises:
   using, by the remote test server, the approximate functional dependence of the probe timing offset on the master clock time to update the probe timestamps of the test messages received from the probe.

5. The method of claim 1, wherein a follow-up timing message addressed to the slave device comprises the master clock time T1.

6. The method of claim 1, wherein a third timing message sent from the master device to the slave device comprises the T4 value.

7. The method of claim 1, further comprising:
   receiving, by the remote test server, one or more filtered results packets (FRP) comprising the T1 and T2 values, wherein the second timing message comprises a probe clock time, and the T3 value is determined from the probe clock time, and wherein a third timing message is sent from the master device to the slave device and received by the network probe, and comprises the T4 value.

8. The method of claim 7, further comprising:
   transmitting, by the remote test server, an 'Inject' command to the network probe that enables the network probe to generate the second timing message.

9. The method of claim 1, further comprising:
   sending, by the network probe, a request to join a multicast group of the master device for receiving timing messages from the master device.

10. The method of claim 1, further comprising: copying, by the network probe, timing messages sent from the master device to the slave device prior to relaying said messages to the slave device.

11. The method of claim 1, wherein T3 is the probe clock time of transmitting the second timing message from the slave device to the master device.

12. A network probe connected, via a network, to a master device including a master clock, the network probe comprising:
   at least one interface; and
   a hardware circuit to:
      transmit, via the at least one interface, to the master device, a request to join a multicast group of the master device for receiving timing messages;
      obtain, via the at least one interface, timing messages exchanged by the master device with a slave device of the multi-cast group, the timing messages indicating master clock time T1 when a first timing message was transmitted by the master device;

receive, via the at least one interface, an 'Inject' command from a remote test server;

transmit, via the at least one interface, a second timing message to the master device in response to receiving the 'Inject' command;

store, in memory, probe clock times T2 when the first timing message was received from the master device and T3 when the second timing message was transmitted by the network probe;

obtain master clock time T4 when the second timing message was received by the master device;

transmit, via the at least one interface, test messages to a remote test server; and transmit, via the at least one interface, T1, T2, T3, and T4 to the remote test server for computation of a probe time offset O at the remote test server and for adjustment of probe timestamps of the test messages such that the probe timestamps are synchronized with the master clock.

13. The network probe of claim 12, wherein the hardware circuit is to:

receive, via the at least one interface, a third timing message sent from the master device to the slave device, wherein the third timing message comprises the master clock time T4.

14. A test server apparatus comprising:

a processor; and a memory comprising instructions that when executed by the processor, cause the processor to:

receive network test messages from a remote network probe and a master device comprising a master clock;

obtain timing messages received by the remote network probe from the master device, the timing messages comprising values of master clock times T1 when a first timing message was transmitted by the master device and T4 when a second timing message was received by the master device;

receive probe clock time values comprising T2 when the first timing message was received by the remote network probe and T3 when the second timing message was transmitted by the remote network probe, wherein the first timing message is addressed by the master device to a slave device disparate from the remote network probe, and T2 is the probe clock time of arrival of the first timing message at the remote network probe;

compute a probe time offset O based on T1, T2, T3 and T4; and adjust probe timestamps of the network test messages based on the probe time offset O such that the probe timestamps synchronize with the master clock.

15. The apparatus of claim 14, wherein the instructions to compute a probe time offset O further comprise instructions that cause the processor to:

process a plurality of probe offset values from a historical record; and reduce noise related to a network delay jitter.

* * * * *